United States Patent [19]
Scott

[11] Patent Number: 5,806,734

[45] Date of Patent: Sep. 15, 1998

[54] BODY MOUNTED CAMERA SUPPORT

[76] Inventor: John Scott, P.O. Box 515, Fallbrook, Calif. 92088

[21] Appl. No.: 729,792

[22] Filed: Oct. 8, 1996

[51] Int. Cl.[6] ............................... A45F 3/00; G03B 17/56
[52] U.S. Cl. .................... 224/265; 224/270; 224/255; 224/908; 294/139; 396/420; 396/421
[58] Field of Search ...................... 324/908, 201, 324/265, 266, 270, 255; 294/139; 352/243; 396/421, 420, 428

[56] References Cited

U.S. PATENT DOCUMENTS

| | | | |
|---|---|---|---|
| 2,370,611 | 2/1945 | Du Mais | 294/139 |
| 2,552,205 | 5/1951 | Moss | 224/908 |
| 2,603,134 | 7/1952 | Burnam | 224/908 |
| 2,711,122 | 6/1955 | Klumpp | 224/908 |
| 3,002,663 | 10/1961 | Fernelius | 224/908 |
| 3,984,855 | 10/1976 | Baczynsky | 224/908 |
| 4,037,763 | 7/1977 | Turchen | 224/908 |
| 4,514,067 | 4/1985 | Gallegos et al. | 224/908 |
| 5,073,788 | 12/1991 | Lingwall | 352/243 |

Primary Examiner—Linda J. Sholl
Attorney, Agent, or Firm—James E. Brunton

[57] ABSTRACT

A body-mounted camera support which includes a generally ring-shaped, neck-encircling member to which a camera support assembly is pivotally connected. The camera support assembly includes a support platform for supporting the camera, a platform supporting track extending outwardly from the neck encircling member for slidably supporting the support platform, and a gripping handle assembly pivotally connected to the track for gripping by the user to quickly and easily position the track and the camera platform both elevationally and directionally relative to the user's body. When the camera is not in use, the camera support assembly depends downwardly from the neck encircling member and rests comfortably against the user's upper body. When the photographer desires to use the camera, the camera support assembly can be quickly raised and pointed by gripping the gripping handle assembly. After the camera support assembly has been raised to a generally horizontal position, the camera support platform can then be slidably moved along the tracks to a position wherein the view finder of the camera is correctly disposed proximate the user's eye.

24 Claims, 5 Drawing Sheets

BODY MOUNTED CAMERA SUPPORT

BACKGROUND OF THE INVENTION

1. Field of the Invention

The present invention relates generally to camera supports. More particularly, the invention concerns a portable, body-mounted camera support which is quickly and easily adjustable to permit optimum camera positioning for a particular user.

2. Discussion of the Invention

Traditionally, prior art camera supports have consisted of relatively fixed supports such as tripods, monopods and various types of clamping arrangements. While such supports function adequately to hold the camera steady, they are usually quite cumbersome, difficult to transport and generally require considerable time and effort to assemble and disassemble. Quite often, therefore, small cameras are simply hand held and in some cases may be supported during non-use by a flexible strap that encircles the user's neck.

Holding the camera, whether it be a still camera, a movie camera or a video camera, has a number of disadvantages. For example, during a photo opportunity it is difficult to hold the camera steady and even minor camera movement can adversely affect the quality of the resulting picture. Further, two hands are usually required to properly support the camera and operate the shutter. Additionally, holding the camera by hand substantially increases the risk of dropping the camera.

With the advent of small, portable video cameras, recreational picture taking has become very popular and many thousands of these cameras are sold annually. Typically, the small video camera is specifically designed to be hand held. However, often one or more straps are generally provided by the manufacturer which typically encircle the user's hand and assist in gripping the camera. However, in actual use, the video cameras still tend to be somewhat cumbersome to hold and operate with one hand and, accordingly, two hands are usually required to obtain high quality filming results.

Because of the difficulties in using hand-held, still and video cameras, a number of different kinds of portable camera supports have been suggested. For example, U.S. Pat. No. 5,294,947 issued to Harrington discloses a body-mounted camera support that includes a hinged camera platform which is attached to a shoulder yoke for balance and support. Similarly, U.S. Pat. No. 4,526,308 discloses a camera support which may be hooked over the shoulders of the user. Still another prior art camera support is disclosed in U.S. Pat. No. 3,273,484 issued to Lapsley. This latter patent discloses a camera support that includes a supporting linkage which permits elevation of the camera from a lower inoperative position and an upper operative position.

The present invention is directed to a new and improved camera support which is ideally suited for use with video cameras of various sizes and one which provides numerous benefits and advantages over the prior art camera supports.

SUMMARY OF THE INVENTION

In summary the body-mounted camera support of the present invention comprises a generally ring-shaped, neck-encircling member to which a camera support assembly is pivotally connected. In one form of the invention, the camera support assembly comprises a support platform for supporting the camera; a platform supporting track extending outwardly from the neck encircling member for slidably supporting the support platform; and a gripping handle assembly pivotally connected to the track for gripping by the user to quickly and easily position the track and the camera platform both elevationally and directionally relative to the user's body. More particularly, when the camera is not in use, the camera support assembly depends downwardly from the neck encircling member and rests comfortably against the user's upper body. When the photographer desires to use the camera, the camera support assembly can be quickly raised and pointed by gripping the gripping handle assembly. After the camera support assembly has been raised to a generally horizontal position, the camera support platform can then be slidably moved along the tracks to a position wherein the view finder of the camera is correctly disposed proximate the user's eye.

With the foregoing in mind, it is an object of the present invention to provide a lightweight, body-mounted camera support to which a variety of cameras, including video cameras, movie cameras, and still cameras can readily be attached.

Another object of the invention is to provide a camera support of the aforementioned character which, when not in use, can be comfortably suspended about the user's neck so as to permit photographer to keep both hands free to accomplish other tasks. When a photo opportunity arises, the camera support can be quickly and easily lifted to place the camera into a filming position wherein the viewfinder of the camera is correctly positioned relative to the user's eye. Because of the forward position of the lifting grip, motion of the camera lens is substantially is reduced, thereby reducing possible distortion caused by movement of the camera lens.

Another object of the invention is to provide a camera support as described in the preceding paragraphs in which the camera support platform is slidably mounted on a pair of spaced-apart tracks so that it can be quickly adjusted to position the camera viewfinder at the optimum location for the particular photographer using the device.

Another object of the invention is to provide a camera support of the character described herein in which a platform stop is provided to enable the camera support platform to be returned to a predetermined position after each adjustment.

Another object of the invention is to provide a camera support of the type described in the preceding paragraphs in which the neck-encircling member of the apparatus is freely rotatable relative to the user's neck so as to permit quick and easy panning of the camera even when the user's eyes are not looking through the camera viewfinder.

Another object of the invention is to provide a body-mounted camera support which can readily be folded into a transport configuration so that the device can be transported in a small travel case of a size no larger than 11 inches long, 7 inches wide and ¾ inch thick.

Another object of the invention is to provide a camera support of the class described which is durable, is easy to use, and is of simple construction so that it can be inexpensively manufactured in large volume.

BRIEF DESCRIPTION OF THE DRAWINGS

FIGS. 4A and 4B when taken together comprise a top plan view of the form of the body mounted camera support shown in FIG. 1.

DESCRIPTION OF THE INVENTION

Referring to the drawings and particularly to FIGS. 1 through 4, one form of the body-mounted, camera support apparatus of the present invention is there illustrated and generally designated by the numeral 12. The support assembly is designed for engagement with the user's body in the manner shown in FIGS. 2 and 3 and for this purpose includes a generally ringshaped neck encircling subassembly 14 which is disposed in a first plane (see FIG. 2). A camera support assembly, generally designated by the numeral 16, is pivotally connected to the neck encircling subassembly 12 in a manner presently to be described.

Figures 1, 2:
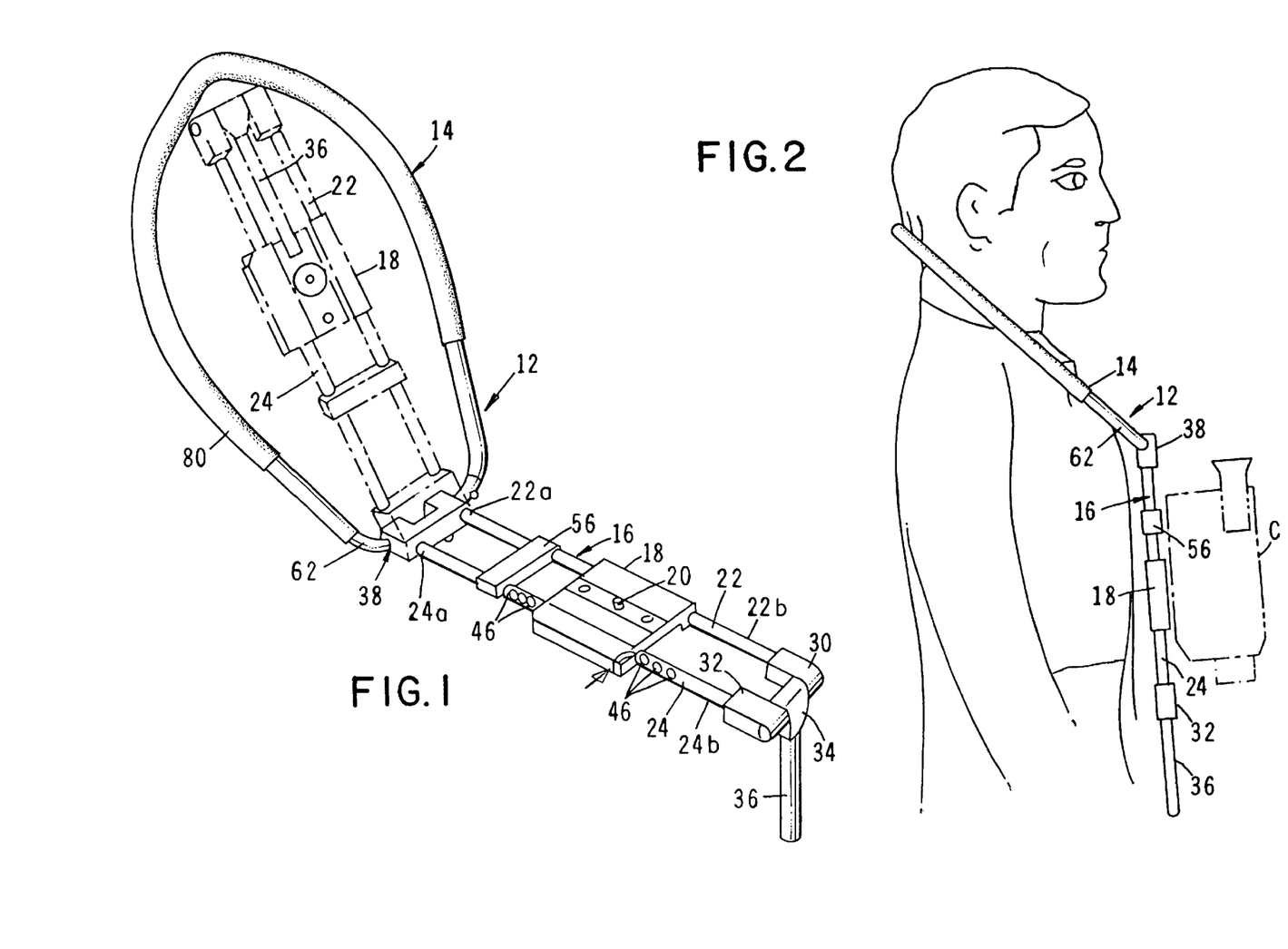
FIG. 1 is a generally perspective view of one form of the body mounted camera support of the invention.
FIG. 2 is a generally illustrative view showing the camera support mounted on the body of the user with the camera in a non-operational position.
Figure 3:
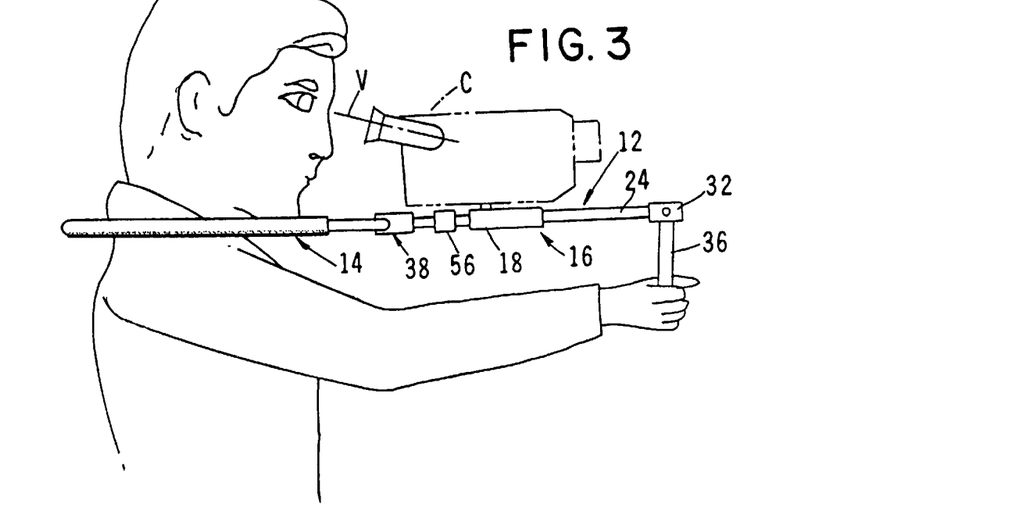
FIG. 3 is a generally illustrative view similar to FIG. 2 but showing t e camera raised to an operational position.
Figure 4A:
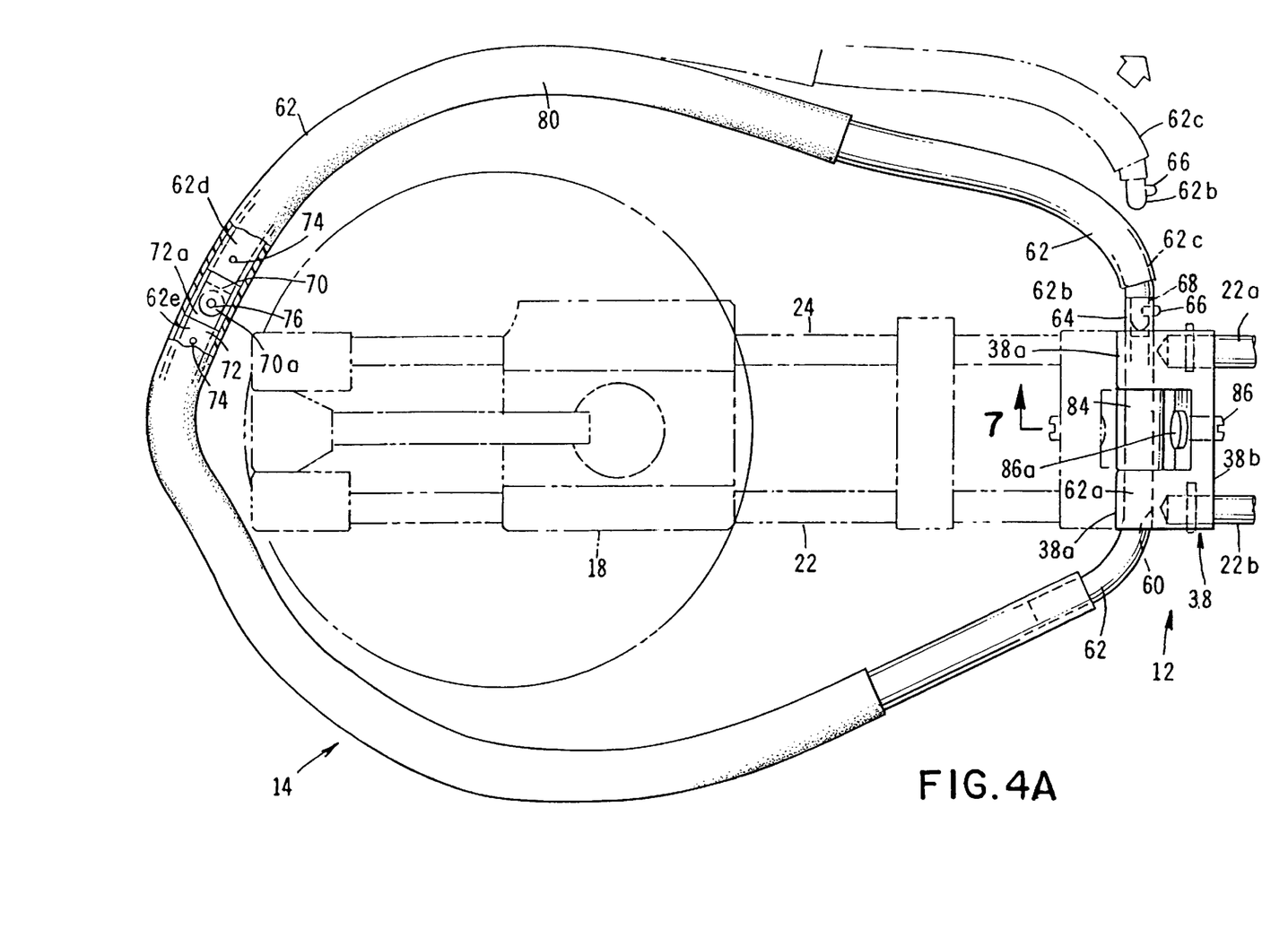
FIG. 4A is a top plan view primarily of the neck encircling member of the apparatus partly broken away to show internal construction.
Figures 4B, 7:
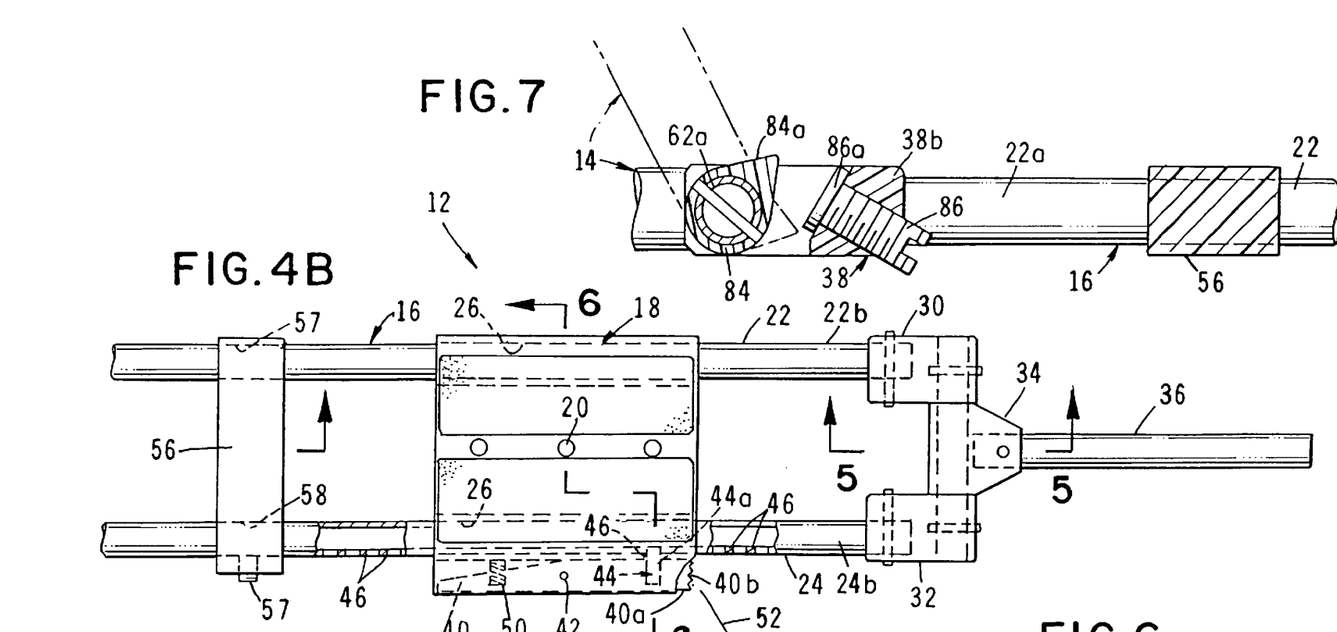
FIG. 4B is a top plan view primarily of the camera support assembly of the apparatus.
FIG. 7 is a cross-sectional view taken along lines 7—7 of FIGS. 4A and 4B.
Figure 6:
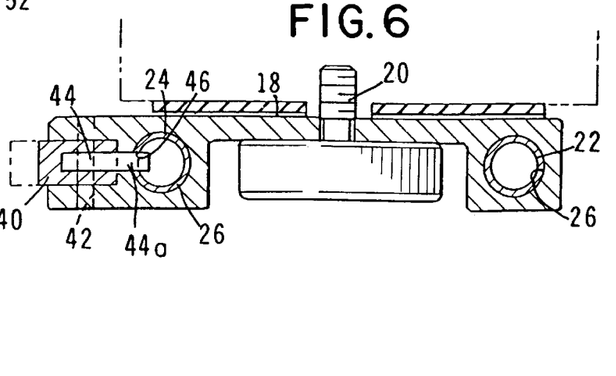
FIG. 6 is a cross-sectional view taken along lines 6—6 of FIG. 4B.
Figure 8:
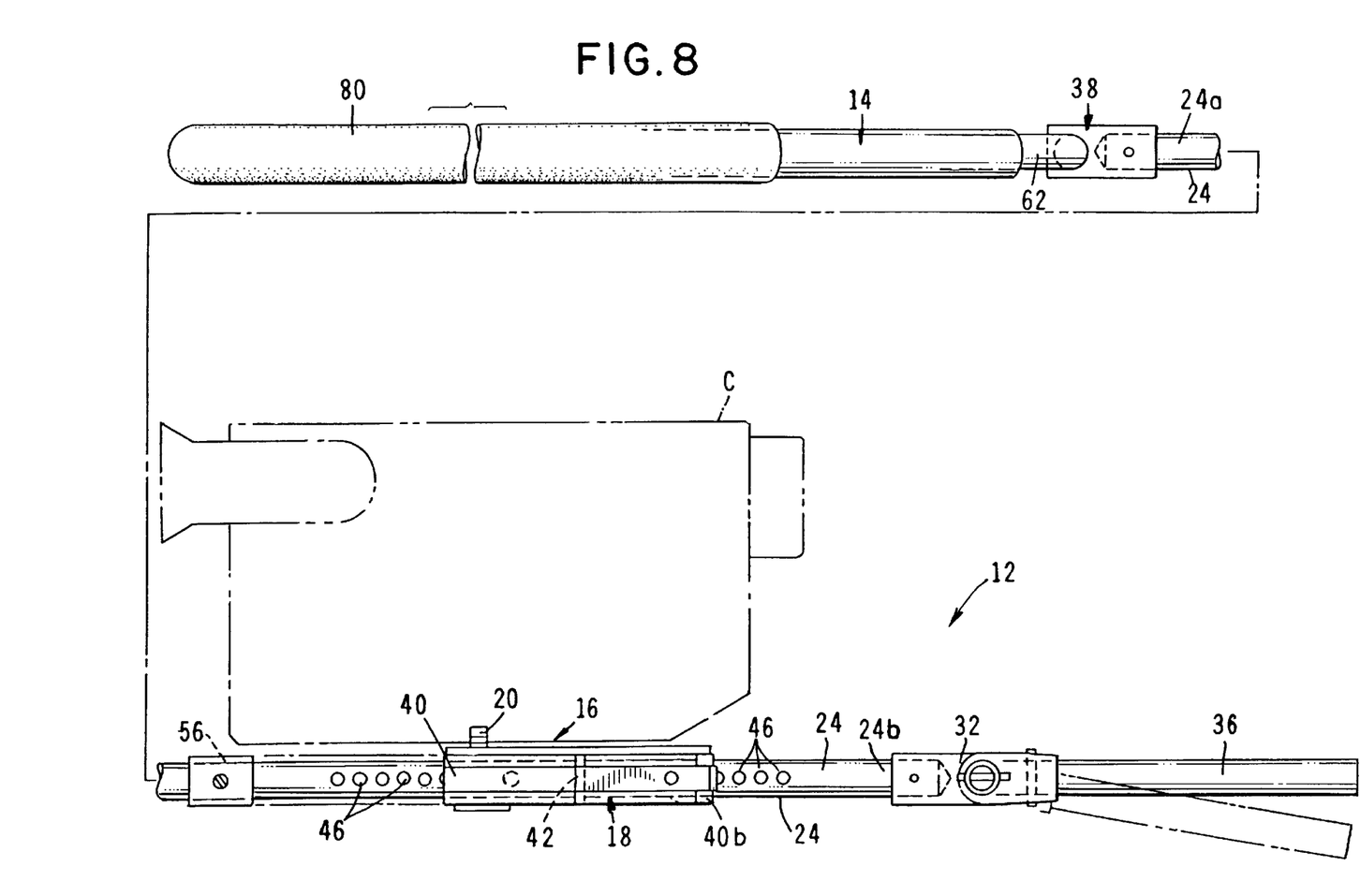
FIG. 8 is an enlarged side-elevational view of the camera support apparatus showing the tracks of the apparatus in an elevated position.

The camera support assembly 16 comprises a support platform 18 for supporting a camera, such as a video camera "C" shown in dotted lines in FIG. 2. Camera "C" is removably interconnected with support platform 18 by a freely rotatable threaded connector 20 of conventional design (see also FIG. 6). Support platform 18 is slidably connected to track means which extend outwardly from neck encircling subassembly 14 in the manner shown in FIG. 3. This track means is here provided in the form of a pair of spaced-apart tubular-shaped tracks 22 and 24 each having first and second ends 22a and 22b and 24a and 24b respectively. As indicated in FIGS. 3, 4B and 6, tracks 22 and 24 are disposed within a second plane and are closely receivable within transversely spaced-apart, longitudinally extending bores 26 provided in support platform 18. With this construction, platform 18 can be slidably moved along tracks 22 and 24 from a first inward position proximate neck encircling subassembly 14 to a second outward position.

Figure 5:
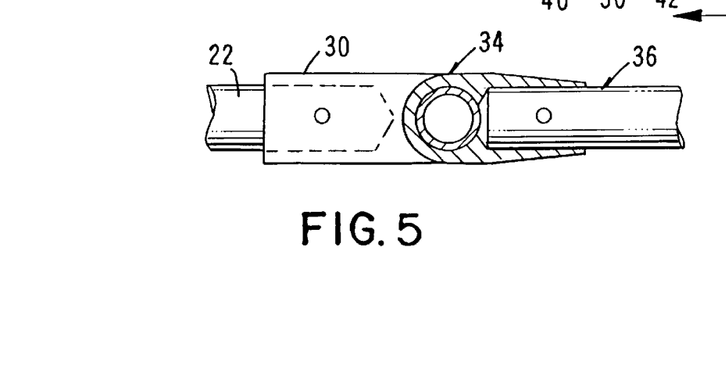
FIG. 5 is a cross-sectional view taken along lines 5—5 of FIG. 4B.

Also forming a part of the camera support means, or support assembly 16 of the invention, is gripping means for gripping by the user to position the track means and the support platform both elevationally and directionally relative to the user's body. In the form of the invention shown in the drawings, the gripping means comprises a first connector member 30 affixed to track 22 and a second connector member 32 affixed to track 24. Mounted between members 30 and 32 for pivotal movement with respect thereto is a handle support member 34 to which an elongated handle 36 is connected (see also FIGS. 5 and 6).

As illustrated in FIG. 2, when the apparatus of the invention is not in use, the camera support assembly, including handle 36, depends downwardly from neck encircling subassembly 14 in a manner to rest comfortably against the user's chest and upper body. When the operator desires to use the apparatus for a photo opportunity, the operator grasps handle 36 with one hand and lifts the camera support assembly into the generally horizontal position shown in FIG. 3 wherein the plane of tracks 22 and 24 of the support assembly is substantially coplanar with the plane of the neck encircling subassembly 14. With the camera support assembly in this position, handle 36 extends generally perpendicularly to the plane of tracks 22 and 24.

Disposed proximate the opposite end of tracks 22 and 24, from the gripping means is a spanner member 38 which spans the tracks and, in a manner presently to be described, permits the pivotal interconnection of the neck encircling subassembly with the camera support assembly.

Also forming a part of the camera support assembly of the present form of the invention is locking means for releasably locking platform 18 relative to spaced-apart track 22 and 24. As best seen by referring to FIG. 4B and 6, this locking means here comprises a locking lever 40 which is pivotally connected to platform 18 by means of a centrally located pivot pin 42. Connected proximate the inside surface of locking lever member 40 is a locking pin 44 (FIG. 4B) having an outwardly extending end portion 44a. As illustrated in FIG. 4B, portion 44a of the locking pin is designed to be closely receivable within a selected one of a plurality of longitudinally spaced-apart drilled holes 46 formed in track 24. Biasing means are provided to continuously urge pin 44a of the locking pin toward track 24 and into a selected one of the drilled holes 46. This biasing means here comprise a coiled spring 50 connected to the pivoting locking lever 40 in the manner shown in FIG. 4B. Spring 50 acts on platform 18 and functions to continuously urge end 44a of locking pin 44 in a direction toward track 24.

To slide platform 18 along tracks 22 and 24, it is necessary to exert an outward force on end 40a of locking member 40 in the direction of the arrow 52 (FIG. 4B). Such a force will overcome the urging of spring 50 and permit withdrawal of the locking pin 44 from the hole 46 in which it resides. Once the locking pin is removed from the drilled hole, the platform can be slidably moved along tracks 22 and 24 to a selected location. Upon release of the locking member, the biasing means, or spring 50, will urge end 44a of the locking pin into a selected one of the drilled holes 46. To assist in pivotal outward movement of end 40a of locking member 40 relative to platform 18, outboard end 40a is provided with a plurality of saw-tooth-like protuberances 40b for engagement by the finger of the user.

Still another important feature of the camera support means of the invention is a stop means for positioning support platform 18 at a selected position along tracks 22 and 24. The stop means is here provided in the form of a stop member 56 which is slidably connected to the track means for sliding movement relative thereto between first and second positions. As best seen in FIG. 1, stop member 56 spans tracks 22 and 24 and is provided with spaced-apart bores 58 within which tracks 22 and 24 are closely receivable. As will be discussed in greater detail in the succeeding paragraphs wherein the operation of the apparatus of the invention is further described, stop member 56 can be positioned along tracks 22 and 24 at any desired location so as to locate platform 18 in an optimum location for correctly positioning the viewfinder "V" of the camera "C" with respect to the eye of the user. Stop member 56 can be located in this optimum position by means of a set screw 57 which, when threaded inwardly, frictionally engages track 24.

As previously mentioned, connector member 38, which spans tracks 22 and 24, functions to pivotally interconnect neck encircling subassembly 14 with the camera support means or support assembly 16. For this purpose, member 38 is provided with a transverse bore 60 within which end 62*a* of a neck encircling member 62 can be rotatably received (see FIG. 4A). Received within bore 60 at the opposite side of member 36 is an outwardly extending tubular member 64 which is adapted to closely receive a connector stub 62*b* provided proximate second end 62*c* of neck encircling member 62. Connected to connector stub 62*b* is a detent assembly 66 which is of conventional construction and includes an outwardly extending portion which is removably receivable within a drilled hole 68 provided in tubular extension 64. With this construction, when connector stub 62*b* is inserted into tubular member 64, detent 66 will move into alignment with drilled hole 68 and function to removably secure end 62*c* of the neck encircling member with the tubular extension 64. With end 62*c* secured in position, the camera support assembly can be easily pivoted upwardly and downwardly relative to neck encircling member 62.

To permit end 62*c* the neck encircling member 62 to be moved away from connector member 38, a hinge means is provided intermediate ends 62*a* and 62*c* of member 62. This hinge means here comprises first and second hinge members 70 and 72 each of which have cylindrical shank portions that are closely receivable within intermediate end portions 62*d* and 62*e* of neck encircling member 62. Members 70 and 72 can be secured to end portion 62*d* and 62*e* by any appropriate means such as locking pins 74. As best seen in FIG. 4A, member 72 is provided with a tongue 70*a* which is closely receivable within a tongue receiving groove 72*a* provided in member 72. A pivot pin 76 pivotally interconnects tongue 70*a* within groove 72*a* to permit pivotal movement of end portion 64*d* of member 62 relative to end portion 62*e*. As illustrated by the phantom lines in FIG. 4A, this pivotal movement allows separation of end 62*c* of the neck encircling member from the connector member 38 so that the assemblage can be easily removed from about the user's neck. However, to limit the extent of this separation, a yieldably deformable tubular member such as a length of plastic tubing, 80 surrounds a portion of neck encircling member 62 and spans the hinge means in the manner shown in FIG. 4A. While the yieldably deformable length of tubing 80 tends to limit pivotal movement between hinge members, the pivotal movement permitted is sufficient to allow adequate separation between end 62*c* of member 62 and connector member 38 to clear the users neck.

In using the apparatus of the present invention, the camera "C" is first affixed to platform 18 using threaded connector 20. Next, end 62*c* is separated from connector member 38 a sufficient distance to permit the neck encircling member 62 to be positioned about the user's neck in the manner shown in FIGS. 2 and 3. This done connector stub 62*b* is moved into a locking position with member 38 and is held in the locked position by means of detent assembly 66. When the apparatus is not in use, the camera and camera support means depends comfortably from the user's neck in the manner shown in FIG. 2.

When a photo opportunity arises, the user can quickly grasp handle 32 and raise the camera support means upwardly into the generally horizontal position shown in FIG. 3. By releasing the locking means, platform 18, along with camera "C", can be slidably moved inwardly or outwardly relative to the track means so as to position the view finder "V" of the camera at an appropriate longitudinal position with respect to the user's eye. Once this position has been established, the stop means, or stop member 56, can be moved along tracks 22 and 24 to a location where it engages the inboard edge of platform 18. The stop member can then be secured in this position by tightening set screw 57. In this way, each time the apparatus is used with the particular camera "C", the platform can be automatically returned to the optimum sighting position by sliding the platform along the tracks until it moves into stopping engagement with stop member 56.

It is important to note that with the apparatus in the photo opportunity position shown in FIG. 3, the entire assembly can be rotated in a generally horizontal plane relative to the neck of the user by simply imparting a side-to-side movement to handle 36. With this unique arrangement, a panoramic view can be easily recorded without the user having to turn his head. By way of example, this feature is highly advantageous if the user is driving an automobile while video taping a scene on one side or the other of the moving vehicle. In such an instance, the user can maintain focus on the highway but still obtain a video tape recording of an object or passing scene on either side of the vehicle.

It is also important to note that, with the apparatus in the photo-opportunity position shown in FIG. 3, the camera lens is positioned rearwardly of the gripping means or handle 36 so that motion of the camera lens is substantially reduced. In this way, the undesirable distortion typically produced by movement of the camera lens can successfully be avoided.

Figure 9:
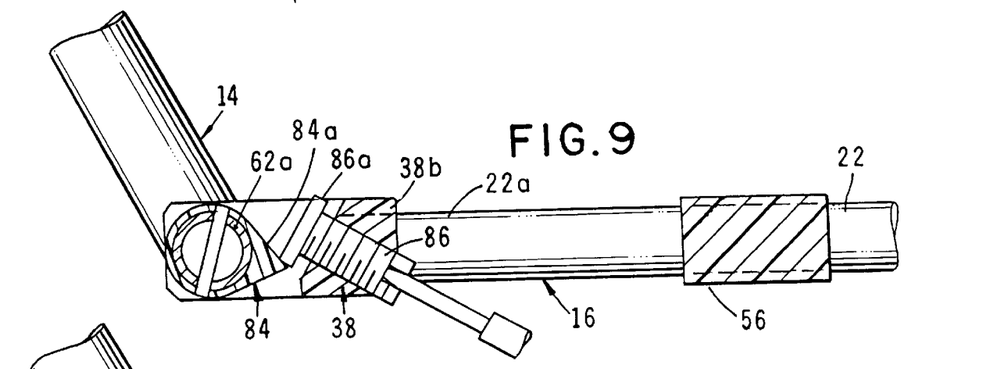
FIG. 9 is a fragmentary, side-elevational view of the platform height adjustment mechanism of the invention.
Figure 10:
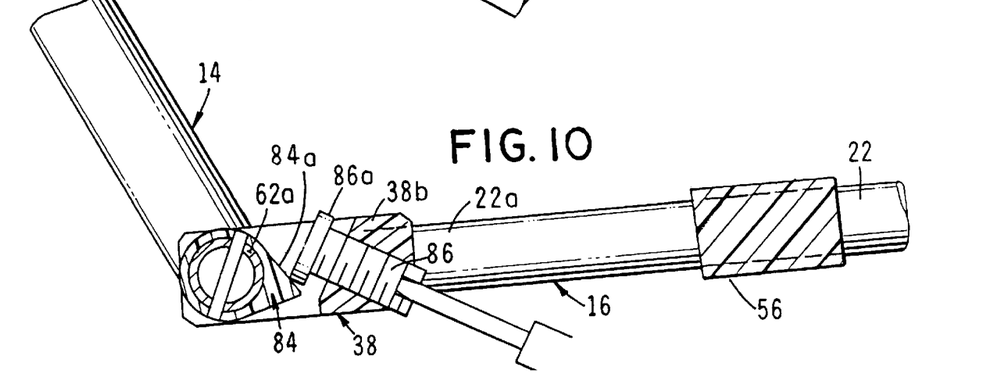
FIG. 10 is a view similar to FIG. 9 but showing the operation of the platform height adjustment mechanism to raise the camera support platform.

Turning now to FIGS. 9 and 10, still another important feature of the apparatus of the present invention is there illustrated. This feature comprises adjustment means for permitting vertical positioning of the view finder "V" of the camera at an optimum height relative to the eye of the user. More particularly, this important adjustment means functions to control the angle at which this the camera support assembly and support platform extends relative to neck encircling member 62 when the support platform assembly is raised into an operating position.

As best seen in FIG. 4A, connector member 38 is generally U-shaped and includes spaced apart legs 38*a*, which are connected to a bight portion 38*b*. In this form of the invention, the adjustment means comprises a generally cam-shaped member 84 which is rotatably connected to ring-shaped member 62 proximate end 62*a* thereof. As best seen in FIGS. 7 and 10, member 84 includes a screw head engagement surface 84*a* which is engageable by the head portion 86*a* of an adjustment screw 86 which is threadably connected to the bight portion 38*b* of connector member 38. As indicated in FIGS. 9 and 10, the relative position of head 86*a* with respect to engagement surface 84*a* of member 84 will precisely control the angle at which the camera support assembly extends relative to ring-shaped member 62.

With the novel construction thus described, when the user first determines the optimum height of the camera view finder with respect to the sighting eye, cam-like member 84 along with adjustment screw 86 can be appropriately positioned so that the camera support assembly can be returned to this optimum location each time the assembly is raised into the photo opportunity position.

Turning now to FIGS. 4A and 4B, it is to be noted that the apparatus of the invention can be conveniently folded into a highly compact transport configuration by pivotally moving the camera support assembly from the extended position shown by the solid lines in FIG. 4B to the folded position shown by the phantom lines in FIG. 4A. In this folded position, the device can be placed within a small transport case of a size 11 inches long, 7 inches wide and ¾ inch thick for easy transport or storage.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A body-mounted camera support for engagement with the user's body comprising:
   (a) a generally planar shaped neck-encircling member having first and second ends and being disposed in and remaining in a first plane;
   (b) camera support means for supporting a camera, said camera support means being pivotally connected to said neck-encircling member proximate said second end thereof, and comprising:
      (i) a support platform for supporting the camera;
      (ii) track means extending outwardly from said neck encircling member for slidably supporting said support platform for movement of said support platform between first and second positions said track means comprising first and second tracks disposed in a second plane; and
      (iii) gripping means connected to said track means for gripping by the user to locate said track means and said support platform both elevationally and directionally relative to the user's body and to locate said generally ring shaped neck encircling member in a substantially coplanar relationship with said second plane of said first and second tracks.

2. A support as defined in claim 1 in which said camera support means further includes stop means for locating said support platform longitudinally of said track means, said stop means being slidably connected to said track means for sliding movement relative thereto between first and second positions.

3. A support as defined in claim 1 in which said track means of said camera support means comprises a pair of spaced-apart tracks along which said support platform slides.

4. A support as defined in claim 1 in which said camera support means further includes locking means for releasably locking said platform against movement relative to said track means.

5. A support means as defined in claim 1 in which said camera support means further includes a connector member connected to and spanning said track means, said neck encircling member being connected to said connector member.

6. A support as defined in claim 1 in which said camera support assembly further includes a connector member connected to and spanning said spaced-apart tracks proximate said first end thereof, said neck encircling member being connected thereto.

7. A support as defined in Clam 6 in which said camera support assembly further includes stop means for locating said support platform longitudinally of said track means.

8. A support as defined in claim 6 in which said neck encircling member comprises hingeably interconnected first and second arcuate-shaped elements movable between first and second positions.

9. A support as defined in claim 6 in which said camera support assembly further comprises adjustment means for positioning the view finder of the camera at a selected height relative to the user.

10. A body-mounted camera support for engagement with the user's body comprising:

(a) a generally ring-shaped, neck-encircling member having first and second ends, said member being disposed in and remaining in a first plane;
   (b) camera support assembly for supporting a camera having a view finder, said camera support assembly being connected to said neck-encircling member for pivotal movement with respect thereto, said support assembly comprising:
      (i) a support platform for supporting the camera;
      (ii) a pair of spaced-apart tracks having first and second ends, said tracks being disposed substantially in a second plane and extending outwardly from said neck encircling member for slidably supporting said support platform for movement thereof between a first inward position and a second outward position;
      (iii) gripping means pivotally connected to said spaced-apart tracks for gripping by the user to raise said tracks to a substantially horizontal position and to bring said second plane of said tracks into a substantially coplanar relationship with said first plan of said neck encircling member; and
      (iv) locking means for releasably locking said platform against sliding movement relative to said spaced-apart tracks.

11. A support as defined in claim 10 in which one of said first and second ends of said neck-encircling member is pivotally connected to said connector member and the other of said first and second ends of said neck-encircling member is removably connected to said connector member.

12. A body-mounted camera support for engagement with the user's body comprising:
   (a) a generally ring-shaped, neck-encircling member having first and second ends;
   (b) camera support assembly for supporting a camera, said camera support assembly being pivotally connected to said neck-encircling member, said, support assembly comprising:
      (i) a support platform for supporting the camera;
      (ii) a pair of spaced-apart tracks having first and second ends, said tracks extending outwardly from said neck encircling member for slidably supporting said support platform for movement thereof between a first inward position and a second outward position;
      (iii) locking means for releasably locking said platform against sliding movement relative to said spaced-apart tracks;
      (iv) a connector member connected to and spanning said spaced-apart tracks proximate said first end thereof; and
      (v) gripping means connected to said spaced-apart tracks for gripping by the user to raise said tracks to a substantially horizontal portion, said gripping means comprising:
         a. a first member connected to one of said spaced apart tracks;
         b. a second member connected to the other of said spaced-apart tracks;
         c. a handle support member pivotally connected to said first and second members intermediate thereof; and
         d. an elongated handle connected to said handle support member and extending outwardly therefrom.

13. A support as defined in claim 12 in which said first end of said neck-encircling member is pivotally connected to said connector member and in which said second end of said neck-encircling member is removably connected thereto.

14. A support as defined in claim 13 in which said neck-encircling member comprises hingeably interconnected first and second arcuate-shaped elements movable between first and second positions.

15. A support as defined in claim 14 in which said neck encircling member further includes detent means for lockably interconnecting said second end of said neck encircling member with said connector member.

16. A support as defined in claim 15 further including adjustment means for angularly positioning said support platform relative to said neck encircling member.

17. A support as defined in claim 15 in which said connector member of said camera support assembly comprises a first U-shaped member and in which said adjustment means comprises a cam-shaped member connect to said neck-encircling member and an adjustment screw threadably connected to said U-shaped connector member.

18. A body-mounted camera support for engagement with the user's body comprising:
   (a) a generally ring-shaped, neck-encircling member having first and second ends;
   (b) camera support assembly for supporting a camera having a view finder, said camera support assembly being connected to said neck-encircling member for pivotal movement with respect thereto, said support assembly comprising:
      (i) a support platform for supporting the camera;
      (ii) a pair of spaced-apart tracks having first and second ends, said tracks extending outwardly from said neck encircling member for slidably supporting said support platform for movement thereof between a first inward position and a second outward position;
      (iii) gripping means pivotally connected to said spaced-apart tracks for gripping by the user to raise said tracks to a substantially horizontal position, said gripping means comprising:
         a. a first member connected to one of said spaced-apart tracks;
         b. a second member connected to the other of said spaced-apart tracks;
         c. a handle support member pivotally connected to said first and second members intermediate thereof; and
         d. an elongated handle connected to said handle support member and extending outwardly therefrom; and
      (iv) locking means for releasably locking said platform against sliding movement relative to said spaced-apart tracks;
      (v) a connector member connected to and spanning said spaced-apart tracks proximate said first end thereof, said neck encircling member being connected thereto.

19. A body-mounted camera support for engagement with the user's body comprising:
   (a) a generally ring-shaped, neck-encircling member having first and second ends;
   (b) camera support assembly for supporting a camera having a view finder, said camera support assembly being connected to said neck-encircling member for pivotal movement with respect thereto, said support assembly comprising:
      (i) a support platform for supporting the camera;
      (ii) a pair of spaced-apart tracks having first and second ends, said tracks extending outwardly from said neck encircling member for slidably supporting said support platform for movement thereof between a first inward position and a second outward position;
      (iii) gripping means pivotally connected to said spaced-apart tracks for gripping by the user to raise said tracks to a substantially horizontal position;
      (iv) locking means for releasably locking said platform against sliding movement relative to said spaced-apart tracks; and
      (v) a connector member connected to and spanning said spaced-apart tracks proximate said first end thereof, said neck encircling member being connected thereto, said connector member comprising a generally "U" shaped member; and
      (vi) adjustment means for positioning the view finder of the camera at a selected height relative to the user, said adjustment means comprising a generally cam-shaped member connected to said ring-shaped neck encircling member proximate said first end thereof and an adjustment screw connected to said generally U-shaped member for engagement with said second generally circular-shaped member.

20. A body-mounted camera support for engagement with the user's body comprising:
   (a) a neck-encircling member having generally arcuate shaped tubular portions disposed within a plane and first and second ends;
   (b) camera support means for supporting a camera, said camera support means being pivotally connected to said neck-encircling member proximate said second end thereof, and comprising:
      (i) a support platform for supporting the camera;
      (ii) generally planar track means extending outwardly from said neck encircling member for slidably supporting said support platform for movement of said support platform between first and second positions; and
      (iii) gripping means connected to said track means for gripping by the user to simultaneously move said track means and said neck encircling member; and
      (iv) adjustment means for positioning the view finder of the camera at a selected height relative to the user, said adjustment means comprising a generally cam-shaped member connected to said ring-shaped neck encircling member proximate said first end thereof and adjustment screw connected to said support means for engagement with said second generally circular-shaped member from a first non-coplanar relationship toward a second co-planar relationship.

21. A support as defined in claim 20 in which said gripping means function to simultaneously move said generally planar neck encircling member and said generally planar track means into a substantially horizontal substantially co-planar relationship.

22. A support means as defined in claim 20 in which said camera support means further includes a connector member connected to and spanning said track means, said neck encircling member being connected to said connector member.

23. A support as defined in claim 20 in which said neck encircling member comprises hingeably interconnected first and second arcuate-shaped elements movable between first and second positions.

24. A support as defined in claim 20 further including adjustment means for angularly positioning said support platform relative to said neck encircling member.

* * * * *